United States Patent
Muthiah

(10) Patent No.: US 11,064,194 B2
(45) Date of Patent: Jul. 13, 2021

(54) ENCODING DIGITAL VIDEOS USING CONTROLLERS OF DATA STORAGE DEVICES

(71) Applicant: Western Digital Technologies, Inc., San Jose, CA (US)

(72) Inventor: Ramanathan Muthiah, Bangalore (IN)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 16/670,112

(22) Filed: Oct. 31, 2019

(65) Prior Publication Data

US 2021/0136366 A1    May 6, 2021

(51) Int. Cl.
*H04N 5/917* (2006.01)
*H04N 19/115* (2014.01)
(Continued)

(52) U.S. Cl.
CPC ......... *H04N 19/115* (2014.11); *H04N 19/423* (2014.11); *H04N 19/65* (2014.11)

(58) Field of Classification Search
CPC .... H04N 19/115; H04N 19/65; H04N 19/423; H04N 19/146; H04N 19/15; H04N 19/152; H04N 19/156; H04N 19/149; H04N 19/40; H04N 19/162; H04N 19/61; H04N 19/124; H04N 19/14; H04N 19/44; H04N 19/154; H04N 19/503; H04N 19/34; H04N 19/196; H04N 19/60; H04N 19/21; H04N 19/70;
(Continued)

(56) References Cited

U.S. PATENT DOCUMENTS 5,099,150 A    3/1992  Steele
6,542,075 B2   4/2003  Barker et al.
(Continued)

FOREIGN PATENT DOCUMENTS

EP    1173020 A2    1/2002
EP    1173020 A3    7/2002
(Continued)

OTHER PUBLICATIONS

International Search Report dated Sep. 25, 2020 for International Application No. PCT/US2020/038144.
(Continued)

*Primary Examiner* — Robert Chevalier
(74) *Attorney, Agent, or Firm* — Brinks Gilson & Lione

(57) ABSTRACT

In some embodiments, an apparatus includes a memory configured to store data and a controller coupled to the memory. The controller is configured to receive, from a computing device coupled to the apparatus, one or more frames of a digital video. The controller is also configured to analyze one or more components of the memory. The controller is further configured to determine a set of states for the one or more components of the memory based on the analysis of the one or more components of the memory. The controller is further configured to determine a first encoding rate for the digital video from a plurality of encoding rates based on the set of states for the one or more components of the memory. The controller is further configured to encode the digital video based on the first encoding rate and to store the encoded digital video in the memory.

20 Claims, 5 Drawing Sheets

(51) Int. Cl.
*H04N 19/65* (2014.01)
*H04N 19/423* (2014.01)
*H04N 5/92* (2006.01)

(58) Field of Classification Search
CPC .. H04N 19/159; H04N 19/172; H04N 19/182; H04N 19/147; H04N 19/186
USPC .......................... 386/328, 326, 332, 334, 353
See application file for complete search history.

(56) References Cited

U.S. PATENT DOCUMENTS

| | | | |
|---|---|---|---|
| 6,768,661 B2 | 7/2004 | Vyvoda et al. | |
| 7,631,327 B2 | 12/2009 | Dempski et al. | |
| 7,760,230 B2 | 7/2010 | Russell et al. | |
| 7,847,820 B2 | 12/2010 | Vallone et al. | |
| 8,077,782 B2 * | 12/2011 | Onodera | H04L 25/0222 375/260 |
| 8,412,783 B2 | 4/2013 | Boston et al. | |
| 8,516,019 B2 | 8/2013 | Hunt et al. | |
| 8,676,027 B2 | 3/2014 | Hugosson | |
| 8,725,940 B2 | 5/2014 | Grube et al. | |
| 8,825,721 B2 | 9/2014 | Hunt et al. | |
| 9,037,921 B1 | 5/2015 | Brooker et al. | |
| 9,215,423 B2 | 12/2015 | Kimble et al. | |
| 9,414,109 B2 | 8/2016 | Cheng et al. | |
| 9,489,580 B2 | 11/2016 | Laska et al. | |
| 9,781,479 B2 | 10/2017 | Klappert et al. | |
| 9,836,248 B2 | 12/2017 | Zhang et al. | |
| 10,007,442 B2 | 6/2018 | Hahn et al. | |
| 10,095,445 B2 | 10/2018 | De et al. | |
| 10,228,854 B2 | 3/2019 | Romanovsky et al. | |
| 10,284,231 B2 * | 5/2019 | Canepa | H03M 13/29 |
| 2001/0044856 A1 | 11/2001 | Agesen et al. | |
| 2006/0190419 A1 | 8/2006 | Bunn et al. | |
| 2009/0238479 A1 * | 9/2009 | Jaggi | H04N 19/172 382/236 |
| 2009/0319255 A1 | 12/2009 | Vengerov | |
| 2015/0237351 A1 | 8/2015 | Lee et al. | |
| 2016/0345009 A1 | 11/2016 | Zhong et al. | |
| 2017/0285968 A1 | 10/2017 | Jung et al. | |
| 2018/0020216 A1 | 1/2018 | Philippe | |
| 2018/0068540 A1 | 3/2018 | Romanenko | |
| 2018/0152702 A1 | 5/2018 | Hattori et al. | |
| 2018/0189635 A1 | 7/2018 | Olarig et al. | |
| 2019/0104341 A1 | 4/2019 | Catalano et al. | |
| 2019/0243754 A1 | 8/2019 | Yu et al. | |
| 2019/0246130 A1 | 8/2019 | Sheikh | |
| 2019/0260496 A1 | 8/2019 | Emmanuel et al. | |

FOREIGN PATENT DOCUMENTS

| | | |
|---|---|---|
| EP | 2141928 A1 | 1/2010 |
| JP | 2010-161740 A | 7/2010 |
| KR | 10-2014-0043767 A | 4/2014 |
| KR | 10-2017-0094745 A | 8/2017 |
| WO | 2015/154549 A1 | 10/2015 |
| WO | WO2017/134110 A1 | 8/2017 |

OTHER PUBLICATIONS

Written Opinion dated Sep. 25, 2020 for International Application No. PCT/US2020/038144.
U.S. Appl. No. 16/708,091, filed Dec. 2019, Muthiah et al.
U.S. Appl. No. 16/818,452, filed Mar. 2020, Muthiah et al.
U.S. Appl. No. 16/781,717, filed Feb. 2020, Muthiah et al.
U.S. Appl. No. 15/929,090, filed Jan. 2019, Muthiah et al.
European Search Report in EP Application No. 19216071.1, dated Feb. 7, 2020, 8 pages.
"Data differencing"; Wikipedia entry; downloaded from the Internet at https://en.wikipedia.org/wiki/Data_differencing on Aug. 6, 2019; 3 pages.
"H.264/MPEG-4 AVC"; Wikipedia entry; downloaded from the Internet at https://en.wikipedia.org/wiki/H.264/MPEG-4_AVC on Aug. 6, 2019; 18 pages.
"Video compression picture types"; Wikipedia entry; downloaded from the Internet at https://en.wikipedia.org/wikiVideo_compression_picture_types on Aug. 6, 2019; 4 pages.
U.S. Appl. No. 15/929,090, filed Jan. 11, 2019.
U.S. Appl. No. 16/781,717, filed Feb. 4, 2020 entitled "Storage System and Method for Optimized Surveillance Search."
U.S. Appl. No. 16/781,688, filed Feb. 4, 2020 entitled "Storage System and Method for Automatic Data Phasing."
"Trick mode"; Wikipedia entry; downloaded from the Internet at https://en.wikipedia.org/wiki/Trick_mode on Jul. 22, 2019; 1 page.
"MPEG transport stream"; Wikipedia entry; downloaded from the Internet at https://en.wikipedia.org/wiki/MPEG_transport_stream on Jul. 22, 2019; 6 pages.
Singh, S. et al.; "Real-Time Implementation of Change Detection for Automated Video Surveillance System"; Research article; ISRN Electronics, vol. 2013, Article ID 691930; 5 pages; Jun. 11, 2013.
U.S. Appl. No. 16/708,091, filed Dec. 9, 2019 entitled "Storage System and Method for Video Frame Segregation to Optimize Storage."
Office Action in U.S. Appl. No. 15/929,090, dated Feb. 20, 2020, 17 pages.
Office Action in U.S. Appl. No. 15/929,090, dated Sep. 27, 2019, 16 pages.

* cited by examiner

ENCODING DIGITAL VIDEOS USING CONTROLLERS OF DATA STORAGE DEVICES

BACKGROUND

Field of the Disclosure

This disclosure relates to data storage devices. More particularly, the disclosure relates to encoding digital videos using controllers of data storage devices.

Description of the Related Art

Data storage devices may be used to store data used by computing devices. The computing devices may execute applications, apps, services, processes, threads, etc., that may read, write, update, and/or access data that is stored on the data storage devices. For example, the computing devices may store a digital video on a data storage device.

SUMMARY

In some embodiments, an apparatus is provided. The apparatus includes a memory configured to store data and a controller coupled to the memory. The controller is configured to receive a digital video from a computing device coupled to the apparatus. The controller is also configured to analyze one or more components of the memory. The controller is further configured to determine a set of states for the one or more components of the memory based on the analysis of the one or more components of the memory. The controller is further configured to determine a first encoding rate for the digital video from a plurality of encoding rates based on the set of states for the one or more components of the memory. The controller is further configured to encode the digital video based on the first encoding rate to generate an encoded digital video. The controller is further configured to store the encoded digital video in the memory.

In some embodiments, an apparatus is provided. The apparatus includes a memory configured to store data and a controller coupled to the memory. The controller is configured to receive a digital video from a computing device coupled to the apparatus. The controller is also configured to receive, from the computing device, client data indicating a set of client devices that are communicatively coupled to the computing device. The controller is further configured to determine a first encoding rate for the digital video from a plurality of encoding rates based on the client data. The controller is further configured to encode the digital video based on the first encoding rate to generate an encoded digital video. The controller is further configured to store the encoded digital video in the memory.

In some embodiments, a method is provided. The method includes receiving, by a data storage device from a computing device coupled to the data storage device, a digital video. The method also includes analyzing one or more components of a memory of the data storage device. The method further includes determining a set of states for one or more components of the memory based on the analysis of the one or more components of the memory. The method further includes determining a first codec for the digital video from a plurality of codecs based on the set of states for the one or more components of the memory. The method further includes encoding the digital video based on the first codec to generate an encoded digital video. The method further includes storing the encoded digital video in the memory.

BRIEF DESCRIPTION OF THE DRAWINGS

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Figure 1:
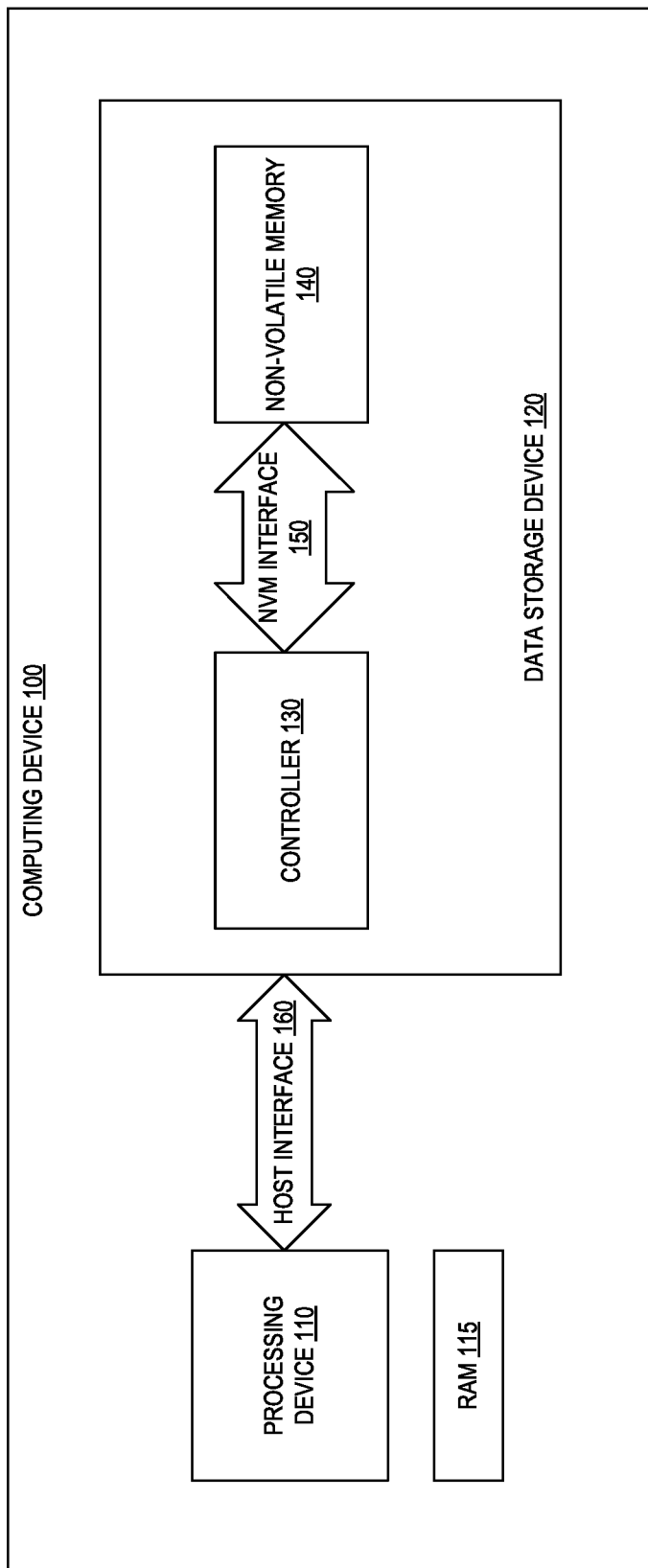
FIG. 1 is a block diagram illustrating an example computing device, in accordance with one or more embodiments of the present disclosure.

In the following disclosure, reference is made to examples, implementations, and/or embodiments of the disclosure. However, it should be understood that the disclosure is not limited to specific described examples, implementations, and/or embodiments. Any combination of the features, functions, operations, components, modules, etc., disclosed herein, whether related to different embodiments or not, may be used to implement and practice the disclosure. Furthermore, although embodiments of the disclosure may provide advantages and/or benefits over other possible solutions, whether or not a particular advantage and/or benefit is achieved by a given embodiment is not limiting of the disclosure. Thus, the following aspects, features, embodiments and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in the claim(s).

The headings provided herein are for convenience only and do not necessarily affect the scope or meaning of the claimed invention. Disclosed herein are example implementations, configurations, and/or embodiments relating to encoding and/or decoding digital videos using controllers (e.g., processors, processing devices, etc.) of data storage devices.

Data storage devices, such as memory cards (e.g., secure digital (SD) cards), memory sticks (e.g., universal serial bus (USB) stick, thumb drives, etc.), solid state drives (SSDs), hard disk drives (HDDs), hybrid drives (e.g., storage drives/devices that include both magnetic media/medium and flash memory), etc., typically include one or more controllers coupled with one or more non-volatile memory (NVM) arrays. The controllers may execute commands (e.g., access commands, data access commands, etc.) to read, write, access, etc., data that may be stored in the one or more NVM arrays.

As discussed above, data storage devices may be used to store data used by computing devices. The computing devices may execute applications, apps, services, processes, threads, etc., that may read, write, update, and/or access data that is stored on the data storage devices. For example, a computing device may be a set-top box that receives a digital video (e.g., a video stream, streaming video, a video channel, etc.) from a video source (e.g., a television service provider, a cable service provider, a satellite television provider, etc.). The set-top box may store the digital videos on the data storage device.

Generally, a computing device may use the data storage device simply as a medium or location for storing data. For example, the data storage device may be a device that receives requests (e.g., commands) to read and/or write data and carries out the requests. In addition, the computing device may not be aware of the health of flash memory in the data storage device (e.g., endurance, age, error rate, etc., of particular cells and/or blocks of the non-volatile memory). This may cause the computing device to encode the digital video using a codec and/or encoding rate that may reduce the endurance, health, and/or life the non-volatile memory more quickly. In various embodiments, examples, and/or implementations disclosed herein, the encoding and/or decoding of the digital videos is performed by the data storage device. The data storage device may use different codecs and/or encoding rates to encode the digital video based on the health, endurance, and/or life of the non-volatile memory. Using different codecs and/or encoding rates may allow the controller to prolong the health, endurance, and/or life of the non-volatile memory. The data storage device may also perform machine learning operations more quickly, easily, and/or efficiently (e.g., without having to first decode a digital video). This may free up computing resources on the computing device which may be used to perform other operations, functions, actions, tasks, etc.

FIG. 1 is a diagram illustrating an example computing device 100, in accordance with some embodiments of the present disclosure. The computing device 100 includes a processing device 110, a random access memory (RAM) 115, and data storage device 120. The processing device 110 may be one or more devices that execute instructions (e.g., executes machine instructions, code, machine code, etc.). Examples of a processing device may include, but are not limited to a controller, a system-on-a-chip (SoC), a field-programmable gate array (FPGA), an application-specific integrated circuit (ASIC), a central processing unit (CPU), a processor, a multi-core processor, a graphics processing unit (GPU), etc. The RAM 115 may be a volatile memory that stores data that may be used by the processing device 110. A volatile memory may be a memory (or other device that stores data and allows access to the data) that does not retain the data when power is not provided to the volatile memory (e.g., when power is turned off).

The computing device 100 may be a device that may execute services, processes, applications, apps, instructions, etc., to perform one or more operations. Examples of computing devices include, but are not limited to, phones (e.g., smart phones, cellular phones, etc.), cable set-top boxes, smart televisions (TVs), video game consoles, laptop computers, tablet computers, desktop computers, server computers, personal digital assistances, wearable devices (e.g., smart watches), media players, cameras, and/or other types of electronic devices. The computing device may also be referred to as a host system. The computing device 100 may be coupled to one or more networks and/or other computing devices via the one or more networks. A network (not illustrated in the figures) may include a public network (e.g., the Internet), a private network (e.g., a local area network (LAN)), a wide area network (WAN) such as the Internet, a wired network (e.g., Ethernet network), a wireless network (e.g., an 802.11 network or a Wi-Fi network), a cellular network (e.g., a Long Term Evolution (LTE) network), routers, hubs, switches, server computers, other types of computer networks, and/or a combination thereof.

The data storage device 120 is illustrated as part of the computing device 100 (e.g., may be located inside of a housing, chassis, case, slot, etc., of the computing device 100) in FIG. 1. In other embodiments, the data storage device 120 may be separate from the computing device 100 (e.g., may be an external device that is coupled to the computing device 100 via a cable or port, such as a universal serial bus (USB) cable or port). In one embodiment, the data storage device 120 may be a hot swappable device. A hot swappable device may be a device that can be removed from the computing device 100 or added to the computing device 100 while the computing device remains in operation. In another embodiment, the data storage device 120 may lack a power source (e.g., lack an internal power source, such as a battery). The data storage device 120 may receive power to operate the data storage device 120 from the computing device 100.

The data storage device 120 may incorporate access command scheduling and/or execution in accordance with embodiments, examples, and/or implementations disclosed herein. The data storage device 120 may be any type of data storage device, drive, module, component, system, or the like. Furthermore, the terms "card," "memory card," "drive," "flash drive," "memory stick," "storage drive," "hard drive" and "data storage drive" may be used herein in certain contexts to refer to any type of data storage device, and may be used substantially interchangeably with the term "data storage device" herein in connection with various embodiments and/or in various contexts. As shown, the data storage device 120 (e.g., hybrid hard drive, solid-state drive, a memory card, any storage device utilizing solid-state memory, a hard disk drive, any storage device utilizing magnetic media/medium, etc.) includes a controller 130 (e.g., control circuitry, software, firmware, or a combination thereof) and a non-volatile memory 140. For example, the data storage device 120 may be a secure digital (SD) card, a miniSD card, a microSD card, a compact flash (CF) card, a multimedia card (MMC), an eXtreme digital (xD) card, etc.

The non-volatile memory (NVM) 140 may be configured for long-term storage of data and may retain data between power on/off cycles of the data storage device 120. The non-volatile memory 140 and/or portions of the non-volatile memory 140 may also be referred to as a storage medium. In some embodiments, the non-volatile memory 140 may include solid-state memory. Solid-state memory may comprise a wide variety of technologies, such as flash integrated circuits, Phase Change Memory (PC-RAM or PRAM), Programmable Metallization Cell RAM (PMC-RAM or PMCm), Ovonic Unified Memory (OUM), Resistance RAM (RRAM), NAND memory (e.g., single-level cell (SLC) memory, multi-level cell (MLC) memory, triple level cell memory, X4 cell memory, etc.), NOR memory, EEPROM, Ferroelectric Memory (FeRAM), magnetoresistive RANI (MRAM), or other discrete solid-state memory chips.

In other embodiments, the non-volatile memory 140 may include magnetic media (including shingle magnetic recording), optical disks, floppy disks, electrically programmable read only memories (EPROM), electrically erasable programmable read only memories (EEPROM), etc. Non-volatile memory that uses magnetic media/medium may include one or more magnetic platters. Each platter may contain one or more regions of one or more tracks of data. The non-volatile memory 140 may include any combination of the one or more types of memories described here. The non-volatile memory 140 may be divided logically and/or physically into cells, dies, arrays, planes, blocks, pages, tracks, and sectors.

The controller 130 may include one or more processors, memory devices, data and/or power transmission channels/paths, boards, or the like. In some embodiments, the controller 130 may be implemented as one or more system-on-a-chip (SoC) modules, field-programmable gate array (FPGA) modules, application-specific integrated circuit (ASIC) modules, processing devices (e.g., processors), chips, or the like. In other embodiments, one or more components of the controller 130 may be mounted on a printed circuit board (PCB). The controller 130 may be configured to receive data commands from a storage interface (e.g., a device driver) residing on the computing device 100.

The controller 130 may communicate with the computing device 100 over a host interface 160, and may receive commands via the host interface 160. A host interface 160 may be hardware, software, and/or a combination thereof that allows the processing device to communicate with the data storage device 120. Examples of host interfaces include, but are not limited to, peripheral component interconnect express (PCIe), serial AT attachment (SATA), small computer system interface (SCSI), non-volatile memory express (NVME), etc. These commands may be referred to as data commands, data access commands, data storage access commands, etc. Data commands may specify a block address in the data storage device 120. Data may be accessed/transferred based on such data commands. For example, the controller 130 may receive data commands (from the computing device 100) and may execute such commands on/in the non-volatile memory 140 (e.g., in one or more arrays, pages, blocks, sectors, etc.). The data commands received from computing device 100 may include read data commands, write data commands, and erase data commands. The controller 130 may be coupled to the non-volatile memory (NVM) 140 via a NVM interface 150. In one embodiment, the NVM interface 150 may include a plurality of channels (e.g., one or more lines, pines, wires, traces, etc.) and each channel may be coupled to different portions of the non-volatile memory 140 (e.g., different NVM arrays, different flash arrays, etc.).

The controller 130 may execute the received data commands to read, write, and erase data from non-volatile memory 140, via the NVM interface 150. For example, the commands may include a read command (e.g. a data read command) to read a block of data from the non-volatile memory 140. The controller 130 may read the data from the page and may transmit the data to the computing device 100 via the host interface 160. In another example, the commands may include a write command (e.g., a data write command) to write data to a page in a non-volatile memory 140. In one embodiment, write commands may include program commands (e.g., a command to write the value "1" to a location the non-volatile memory 140) and erase commands (e.g., a command to write the value "0" to a location, a page, a block, etc., in the non-volatile memory array). The controller 130 may receive the data from the computing device 100 via the host interface 160 and may write the data to the page.

The controller 130 may include an encoder (not illustrated in the figures). The encoder 131 may encode data when storing the data on the non-volatile memory 140. The encoder may encode the data to protect the data from errors, loss, corruption, etc. The encoder may protect the data from errors, loss, corruption, etc., using various methods, techniques, functions, operations, actions, etc. For example, the encoder may protect the data by generating parity data (e.g., parity bits). The parity bits may allow the controller 130 to determine whether there are errors in the data (e.g., errors due to corruption, damaged cells, damaged blocks, error while reading the data, etc.). The parity bits may also allow the controller 130 to correct or recover from errors in the data.

In some embodiments, the encoder encodes stored data using error correction codes (ECCs). An error correction code may include algorithms, methods, techniques, functions, operations, etc., that may encode data into codewords. The codewords (e.g., encoded data) may be decoded even though there may be errors in one or more portions of the codewords. For example, even though one or more bits of the codeword may be incorrect or corrupted (e.g., due to a faulty memory cell), the error correction code can still be used to decode or recover the data encoded in the codeword. One type of error correction code used by the encoder may be may be a low-density parity-check code (LDPC). Another type of binary code used by the encoder 131 may be may be a polar code. The encoder may use the ECCs to generate codewords. A codeword may be a string or series of bits (e.g., a bit string) that is generated based on the data received by the encoder 131 (which is to be stored on the non-volatile memory 140). The codeword may allow the data, which is encoded in the polar code codeword, to be recovered when errors occur.

The controller 130 may also include a decoder (not illustrated in the figures). The decoder may decode data that is stored on the non-volatile memory 140. In some embodiments, decoder decodes stored data (e.g., data encoded into codewords which are stored on the non-volatile memory 140) using ECCs. For example, the decoder 132 may decode codewords which encode the data that is stored on the non-volatile memory 140. The decoder 132 may perform error detection to determine the integrity of data retrieved from non-volatile memory 140 (e.g., to determine the integrity of the data encoded in a codeword). The decoder 132 may also perform error correction of retrieved data. For example, the decoder 132 may use parity data, codewords, etc., to recover the data.

The data storage device 120 may store data received from the computing device 100 such that the data storage device 120 acts as data storage for the computing device 100. To facilitate this function, the controller 130 may implement a logical interface. The logical interface may present to the computing device memory as a set of logical addresses (e.g., sequential/contiguous addresses) where data may be stored. Internally, the controller 130 may map logical addresses to various physical memory addresses in the non-volatile memory arrays 141 and/or other memory module(s). Mapping data indicating the mapping of logical addresses to physical memory addresses may be maintained in the data storage device. For example, mapping table data may be stored in non-volatile memory 140 in order to allow for recreation of mapping tables following a power cycle.

In one embodiment, the processing device 110 may read, write, and/or access data in the non-volatile memory 140. For example, computing device 100 may be a camera (e.g., a video camera, a security camera) and the data storage device 120 may be a memory card (e.g., a SD card) that is coupled to the processing device 110 (e.g., that is inserted into a slot in the computing device 100). As the computing device 100 captures (e.g., records, takes, etc.) images and/or video, the computing device 100 may store the images and/or video on the data storage device 120. For example, the computing device 100 may provide the images and/or video to the data storage device 120 and the controller 130 may write the images and/or video to the non-volatile memory 140.

In one embodiment, the computing device 100 may use the data storage device simply as a medium or location for storing data. For example, the data storage device 120 may be a device that receives requests (e.g., commands) to read and/or write data and carries out the requests. The data storage device 120 may not be used by the computing device to perform other operations, actions, functions, or tasks. This may result in performing the other operations, actions, functions, or tasks on the computing device 100 which may increase the use of computational resources on the computing device 100 (e.g., increase CPU usage, increase memory usage, etc.). In addition, the computing device 100 may not be aware of the health of flash memory in the data storage device 120. For example, the computing device 100 may not be aware of the endurance, age, error rate, etc., of particular cells and/or blocks of the non-volatile memory 140 (e.g., flash memory). This may cause the computing device 100 to encode the digital video using a codec and/or encoding rate that may reduce the endurance, health, and/or life the non-volatile memory 140 more quickly.

Figure 2:
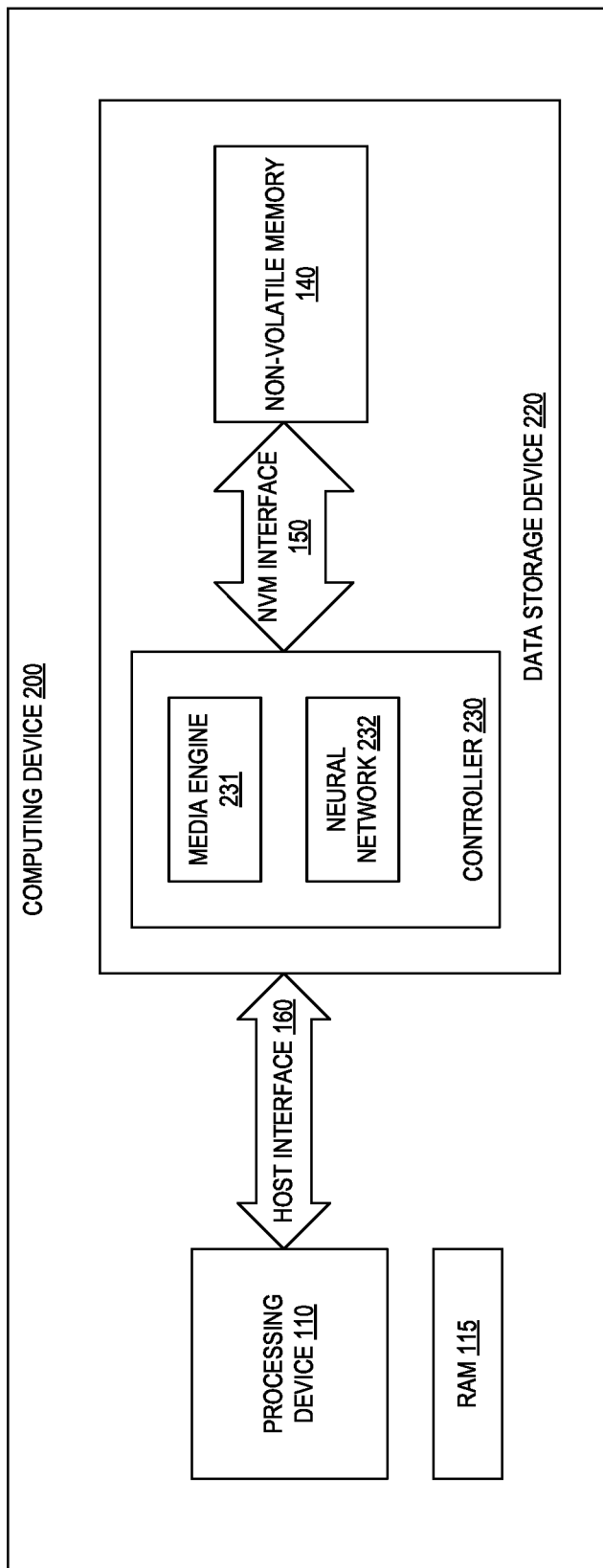
FIG. 2 is a block diagram illustrating an example computing device, in accordance with one or more embodiments of the present disclosure.

FIG. 2 is a diagram illustrating an example computing device 200, in accordance with some embodiments of the present disclosure. The computing device 200 includes a processing device 110, a random access memory (RAM) 115, and data storage device 220, as discussed above. The computing device 200 may be a device that may execute services, processes, applications, apps, instructions, etc., to perform one or more operations. The computing device 200 may be coupled to one or more networks and/or other computing devices via the one or more networks, as discussed in more detail below. In one embodiment, the computing device 200 may be set-top box (e.g., a cable set-top box). The set-top box may allow a user to access, view, store, manage, and/or record various types of media (e.g., digital media) such as digital video, digital audio, video streams, audio streams, video channels, television channels, cable channels, etc. The set-top box may also be referred to as a digital video recorder (DVR).

Although the data storage device 220 is illustrated as part of the computing device 200 (e.g., may be located inside of a housing, chassis, case, slot, etc., of the computing device 200), in other embodiments, the data storage device 220 may be separate from the computing device 200 (e.g., may be an external device that is coupled to the computing device 200 via a cable, such as a universal serial bus (USB) cable). The data storage device 220 may be any type of data storage device, drive, module, component, system, or the like, that is configured to read data, write data, store data, and/or allow access to the data. For example, the data storage device 220 may be solid state disk drive (SSD), a disk drive, a flash drive, a flash disk, a secure digital (SD) card, a miniSD card, a microSD card, a compact flash (CF) card, a multimedia card (MMC), an eXtreme digital (xD) card, a thumb drive, a USB drive, a stick drive, a USB stick, etc. As shown, the data storage device 220 includes a controller 230 (e.g., control circuitry, software, firmware, or a combination thereof) and a non-volatile memory 140. The controller 230 includes a media engine 231 and a neural network 232. The controller 230 may be coupled to a non-volatile memory 140 via a NVM interface 150. The controller 230, media engine 231, and/or neural network 232 may be hardware, software, firmware, or a combination thereof, that is configured to perform one or more computational operations.

The non-volatile memory (NVM) 140 may be configured for long-term storage of data and may retain data between power on/off cycles of the data storage device 220. In some embodiments, the non-volatile memory 140 may include any combination of solid-state memory, magnetic media, optical disks, floppy disks, electrically programmable read only memories (EPROM), electrically erasable programmable read only memories (EEPROM), etc. The non-volatile memory 140 may be divided logically and/or physically into cells, dies, arrays, planes, blocks, pages, tracks, and sectors.

The controller 230 may include one or more processors, memory devices, data and/or power transmission channels/paths, boards, or the like. The controller 230 may be implemented as one or more SoC modules, FPGA modules, ASIC modules, processors, or the like. The controller 230 may be configured to receive data commands from a storage residing on the computing device 200. The controller 230 may communicate with the computing device 200 over a host interface 160, and may receive commands via the host interface 160. These commands may be referred to as data commands, storage commands, data access commands, data storage access commands, etc. Data may be accessed/transferred based on such data commands. The data storage device 220 may store data received from the computing device 200 such that the data storage device 220 acts as data storage for the computing device 200. The controller 230 may implement a logical interface that may present the non-volatile memory 140 as a set of logical addresses where data may be stored. Internally, the controller 230 may map logical addresses to various physical memory addresses in the non-volatile memory 140.

In one embodiment, the processing device 110 may receive capability data from the data storage device 220. The capability data may indicate to the processing device 110 (e.g., the computing device 200) whether the data storage device 220 is capable of encoding/decoding a digital video and/or is capable of performing one or more machine learning operations. In one embodiment, the controller 230 of the data storage device 220 may be capable of performing various computations, functions, operations, actions, etc. This may allow the computing device 200 (e.g., the processing device 110) to offload (e.g., transfer the set of computational operations to the data storage device 220). For example, the computing device 200 offload the encoding, decoding, and/or machine learning operations to the data storage device 220.

In one embodiment, the controller 230 of the data storage device 220 may be capable of performing various computations, functions, operations, actions, etc. For example, the controller 230 may be a processor, a multi-core processor, etc., that may be capable of performing computations, functions, operations, actions, etc., that may typically be performed by the processing device 110. This may allow the computing device 200 (e.g., the processing device 110) to offload (e.g., transfer the set of computational operations to the data storage device 220). For example, the computing device 200 offload the encoding and/or decoding of a digital video to the data storage device 220. In another example, the computing device 200 may offload various machine learning operations to the data storage device 220. A data storage device that is capable of performing various computations, functions, operations, actions, etc., may be referred to as compute storage, converged storage, a compute storage device, a converged storage device, etc.

In one embodiment, the media engine 231 (e.g., the controller 230) may receive a digital video from the processing device 110 (e.g., from the computing device 200). For example, the digital video may be a video stream (e.g., a streaming video, a live video, etc.) transmitted by a television or cable service provider. The processing device 110 may receive one or more frames (e.g., images, pictures, etc.) of the digital video (e.g., video stream) via a network interface (e.g., an Ethernet port, a wireless network interface, a Wi-Fi card, etc.) and may provide the digital video and/or one or more frames to the data storage device 220 and/or media engine 231. In one embodiment, the computing device 200 (e.g., the processing device 110) may provide the digital video to the media engine 231 and/or controller 230 as the computing device receives the digital video. For example, the digital video may be a streaming video, a video stream, a video feed, a video channel, etc. The processing device 110 may receive frames of the digital video (e.g., the streaming video, video stream, etc.) and may provide the frames to the media engine 231 and/or the controller 230 for encoding.

In one embodiment, the media engine 231 (e.g., the controller 230) may analyze one or more components of the non-volatile memory 140. For example, the media engine 231 may analyze cells, blocks, pages, and/or other portions of the non-volatile memory 140 to determine the endurance, age, usage, and/or other information/parameters that may indicate the health of the one or more components of the non-volatile memory 140.

In one embodiment, the media engine 231 (e.g., the controller 230) may determine one or more sets of states for the one or more components (e.g., flash cells, memory cells, blocks, portions, etc.) of the non-volatile memory 140. For example, the media engine 231 may determine the state for a block and/or portion of the non-volatile memory 140. The one or more states may include various parameters, status, conditions, etc., that may indicate the health of the one or more components (e.g., cells, blocks, etc.) of the non-volatile memory 140 (e.g., flash memory). For example, a state of a component may be the endurance of the component (e.g., the endurance of a cell). The endurance of the component may indicate how many more times that the component may be used by the media engine 231 (e.g., how many more times a cell can be reprogrammed). In another example, the state of a component may be an age of the component. The age of the component may indicate how long a component has been used by the media engine 231. The age of the component may also indicate how much longer a component may be used by the media engine 231. In a further example, the state of a component may be an error rate for the component. The error rate may indicate the number of errors that occurred (e.g., bit errors) when accessing data stored in the component (e.g., in the cell, block, page, etc.). In another embodiment, the one or more states may include parameters, status, conditions, etc., that may indicate one or more operations which the controller 130 may be performing. For example, a state may indicate that the controller 130 is performing garbage collection operations (e.g., reading data from a first portion of the non-volatile memory 140 and copying the data to a second portion of the non-volatile memory 140 to free up the first portion of the non-volatile memory 140). Other examples of operations that may be performed by the controller 130 and/or may be indicated by one or more states include flash memory failure handling operations (e.g., operations that handle failures or errors that occur when accessing flash cells/blocks), wear levelling operations, health monitoring operations (e.g., operations to analyze and/or determine the health of a flash cell/block), read scrub operations, etc.

In one embodiment, the media engine 231 (e.g., the controller 230) may determine (e.g., identify, select, etc.) a first encoding rate for the digital video from a plurality of encoding rates based on the set of states (e.g., the endurance, age, health, etc.) for the component components (e.g., blocks, cells, etc.). For example, the media engine 231 may be able to encode the digital video at different encoding rates (e.g., bit rates). An encoding rate may indicate the number of bits, bytes, or other appropriate unit of data, is used to encode a digital video (e.g., to encode a frame or a picture of a digital video). A higher encoding rate may use more bits to encode a digital video and may provide a higher quality (e.g., a higher visual quality, a higher resolution, more colors, etc.). A lower encoding rate may use fewer bits to encode a digital video and may provide a lower quality (e.g., a lower visual quality, a lower resolution, fewer colors, etc.).

The media engine 231 (e.g., the controller 230) may identify or select one of the encoding rates based on the states of the components of the non-volatile memory 140. For example, if the endurance of the components of the non-volatile memory 140 (e.g., the endurance of the cells of blocks of a flash memory) is low or below a threshold (e.g., the number of times the cells or blocks can be reprogrammed is low), the media engine 231 may use a lower encoding rate. If the endurance of the components of the non-volatile memory 140 (e.g., the endurance of the cells of blocks of a flash memory) is high or above a threshold (e.g., the number of times the cells or blocks can be reprogrammed is high), the media engine 231 may use a higher encoding rate.

In one embodiment, the media engine 231 (e.g., the controller 230) may determine (e.g., identify, select, etc.) a first codec for the digital video from a plurality of codecs based on the set of states (e.g., the endurance, age, health, etc.) for the component components (e.g., blocks, cells, etc.). For example, the media engine 231 may be able to encode the digital video using different codecs. A codec may a program, application, function, library, etc., that may be used to encode and/or decode a digital video. Different codecs may encode a digital video at a higher quality. A higher encoding rate may use more bits to encode a digital video and may provide a higher quality (e.g., a higher visual quality, a higher resolution, more colors, etc.) and may increase the storage space used to store the digital video. A lower encoding rate may use fewer bits to encode a digital video and may provide a lower quality (e.g., a lower visual quality, a lower resolution, fewer colors, etc.) and my decrease the storage space used to store the digital video. Using less storage space may increase the endurance and life of the non-volatile memory 140 (e.g., flash memory) because the non-volatile memory 140 may be used to store more digital videos at one time, rather than erasing other data (e.g., other digital videos) to make space for a digital video.

As discussed above, the media engine 231 (e.g., the controller 230) may determine (e.g., identify, select, etc.) an encoding rate (e.g., a bit rate) and/or a codec. In one embodiment, the media engine 231 may encode a digital video based on the determined (e.g., selected, identified, etc.) encoding rate and/or determined codec. For example, the media engine 231 may encode the digital video at the determined encoding rate. In another example, the media engine 231 may encode the digital video using the determined codec. In a further example, the media engine 231 may encode the digital video at the determined encoding rate using the determined codec. Encoding the digital video may generate (e.g., may result in) an encoded digital video. After encoding the digital video (e.g., after generating an encoded digital video), the media engine 231 and/or the controller 230 may store the encoded digital video in the non-volatile memory 140. For example, the media engine 231 and/or the controller 230 may write the encoded digital video (e.g., a video file) to cells, blocks, pages, portions, etc., of the non-volatile memory 140.

As illustrated in FIG. 2, the controller 230 includes a neural network 232. In some embodiments, the neural network 232 may be a collection of connected and/or interconnected nodes. The nodes may also be referred to as neurons. Each node may transmit a signal, messages, data, information, etc., to one or more other nodes. A node may receive a signal, message, data, information, etc., from another node and may generate additional signals, messages, data, information, etc., to transmit to other nodes that are connected to it. The neural network 232 may be a computing model that may be used to determine a feature in input data through various computations. The neural network 232 may determine a feature (e.g., a number, shape, pattern, etc.) in input data (e.g., audio data, image data, video data, etc.) according to a structure that defines a sequence of computations to be performed, and weight values that define coefficients applied to the computations. The neural network 232 may also include weights or weight values. The weights or weight values may be scaling factors between two or more nodes. For example, the structure may be represented as connections of different nodes, where each node represents a summation of its inputs, and a weight value associated with a connection may represent a coefficient or a scaling factor multiplied to an output of a node in that connection.

One type of neural network may be a convolutional neural network (CNN). A CNN may be a feed forward neural network. A feed forward neural network may be a type of neural network where the connections between the nodes do not form a cycle. Another type of neural network may be a recurrent neural network (RNN). A RNN may be a neural network where the connections between nodes may form a directed graph. A RNN may be a type of neural network where the connections between the nodes may form a cycle. Although a neural network is illustrated in FIG. 2, other types of machine learning models, functions, algorithms etc., may be used in other embodiments.

In one embodiment, the media engine 231 (e.g., the controller 230) may perform one or more machine learning operations (e.g., a set of machine learning operations) on the digital video prior to encoding the digital video. For example, the media engine 231 may perform one or more machine learning operations by using and/or executing the neural network 232 to analyze the digital video. The neural network 232 may analyze the digital video (e.g., frames, images, etc., of the digital video). For example, the neural network 232 may analyze the images and/or video to determine if an object, person, event, etc., is present in the digital video. In another example, the neural network 232 may analyze the audio in the digital videos to determine whether one or more words are present.

In one embodiment, the neural network 232 may be able to perform machine learning operations on the digital videos more easily because the media engine 231 and/or the controller 230 is encoding the digital video. This allows the neural network 232 to perform the machine learning operations on the digital video before it is encoded (e.g., on the raw video data, the original video data, etc.). The neural network 232 may perform machine learning operations without using the controller 230 and/or the media engine 231 to decode the digital video first. This allows the data storage device 220 to perform machine learning operations on the digital video more quickly, easily, and/or efficiently. This may also allow the computing device 200 to offload the machine learning operations to the data storage device 220.

In one embodiment, the media engine 231 and/or the neural network 232 may determine one or more inferences (e.g., a set of inferences) based on the one or more machine learning operations. For example, the media engine 231 and/or neural network 232 may determine one or more inferences based on an analysis of one or more digital videos.

In one embodiment, a digital video may include audio data for different languages in the digital video. For example, digital video may include audio data and different portions of the audio data may be for different languages. In another example, the digital video may include multiple audio data and each audio data may be for a different language. In other embodiments, the audio data may be separate from the digital video. For example, the audio data may be separate from the video data (e.g., the frames, images, etc.) for the digital video.

In one embodiment, the media engine 231 (e.g., the controller 230) may determine a set of audio preferences (e.g., one or more audio preferences) based on one or more inferences generated by the media engine 231 and/or neural network 232. A digital video may include and/or may be associated with information such as various flags, packets, identifiers, parameters, values, tables, etc., that may be analyzed by neural network 232 during one or more machine learning operations. For example, the digital video may be streamed and/or transmitted to the computing device 200 in packets, messages, etc. Each packet or message may include a portion of a frame of the digital video or may include one or more frames of the digital video. The packets or messages may include headers that may include the information about the digital video (e.g., includes the flags, identifiers, parameters, tables, etc.). One type of information may be a program map table (PMT). The PMT may indicate the type or classification of a digital video. For example, the PMT may indicate whether the digital video is a news broadcast, a movie, a sports show (e.g., a football game), a children's show, etc. Another type of information included with and/or associated with a digital video may be an audio packet identifier (PID). An audio PID may indicate which languages (e.g., different audio data or portions of audio data) are in the digital video (e.g., English, Spanish, French, Chinese, etc.). Other types of information related to the digital video may also be provided to the media engine 231. For example, information about the duration of the digital video, bibliographic data about the digital video (e.g., the title, the names of people or actors in the digital video, etc.) may be provided to the media engine 231.

In one embodiment, the media engine 231 (e.g., the controller 230) may determine one or more audio preferences for a digital video based on data (e.g., user preferences, settings, parameters, etc.) received from the computing device 200. For example, the media engine 231 may receive user preferences/data indicating one or more preferred languages (e.g., English, Chinese, Spanish, etc.) for a particular digital video (e.g., a particular movie, a particular talk show, a particular news broadcast, a particular sports event, etc.) from the processing device 110. The computing device 200 (e.g., the processing device 110) may receive the preferences/data from a user of the computing device 200 via a user interface (e.g., a graphical user interface, a command line interface, a menu, etc.). In another example, the media engine 231 may receive user preferences/data for different types (e.g., categories, genres, etc.) of digital videos (e.g., news shows/broadcasts, sporting events, documentaries, action movies, etc.). Audio preferences may be data indicating one or more languages that may be played to a user when a user views a digital video. For example, an audio preference may be data (e.g., a table, a list, etc.) indicating that a user prefers to watch documentaries in Chinese (e.g., data indicating that Chinese is a preferred language for a user when the user views/watches documentaries).

In one embodiment, the neural network 232 (e.g., the controller 230) may determine one or more audio preferences for a digital video based on a set of inferences generated based on previous analyses of other digital videos. For example, the neural network 232 may determine that users (of the computing device 200) may watch certain types of digital videos in one or more preferred languages (e.g., may watch the news in Chinese, may watch basketball games in English, etc.). The neural network 232 may determine a preferred language for a digital video based on analysis of the languages indicated by a user (e.g., provided by the user to the computing device 200) and/or languages accessed by a user when a user access the digital video. For example, the neural network 232 may analyze the language that is played when users view various digital videos. The neural network 232 may determine that users of the computing device 200 generally watch news broadcasts in Spanish and watch action movies in English.

In some embodiments, the media engine 231 (e.g., the controller 230) may store audio data for a digital video based on the audio preferences. For example, an audio preference may indicate that a user prefers English when watching news broadcasts. If the PMT for a digital video indicates that the video is a news broadcast, the media engine may analyze the PIDs in the video to determine whether the news broadcast includes audio data for English (e.g., one or more languages that the user prefers when watching news broadcasts). If the digital video includes audio data for English, the media engine 231 may store the audio data (or portion of audio data) for English audio differently than other audio data for other languages (e.g., non-preferred languages), as discussed in more detail below. An audio preference may also be referred to as a bias. For example, a positive bias for a particular audio data may indicate that a language is a preferred language and a negative bias for a particular audio data may indicate that a language is not a preferred language.

In one embodiment, the media engine 231 and/or controller 230 may store the audio data and/or portions of audio data for different languages in different portions (e.g., blocks, cells, etc.) of memory based on one or more audio preferences. For example, audio data for one or more preferred languages for a digital video may be stored onto blocks that are less prone to error (e.g., blocks and/or cells that have been used less) and the audio data for other languages may be stored on blocks that are more prone to error. In another example, audio data for one or more preferred languages for a digital video may be stored onto blocks that have higher endurance. In a further example, audio data for one or more preferred languages for a digital video may be stored onto different types of memory (e.g., the non-volatile memory 140 may include different types of flash memory, such as SLC memory, MLC memory, TLC memory, etc.).

In one embodiment, the media engine 231 and/or controller 230 may store the audio data and/or portions of audio data for different languages using different error correction mechanisms. For example, the media engine 231 may use a stronger error correction code (e.g., an error correction code that may be able to recover from or tolerate more errors in blocks that store the audio data) for the audio data for one or more preferred languages for a digital video and may use a weaker error correction code (e.g., an error correction code that may be able to recover from or tolerate fewer errors in blocks that store the audio data) for the audio data for other languages (e.g., non-preferred languages). Using different error correction mechanisms may allow the media engine 231 to increase the health, endurance, etc., of the data storage device 220. For example, using a weaker error correction code may allow the data storage device 220 to use less data and/or space (e.g., fewer cells, blocks, etc.) to store the audio data for a non-preferred language of a digital video.

In one embodiment, the media engine 231 and/or controller 230 may store the audio data and/or portions of audio data for different languages using different flash programming parameters. Flash programming parameters may refer to parameters, actions, options, etc., that the media engine 231 may use when writing data to a flash memory (e.g., to non-volatile memory 140). An example of a flash programming parameter may be the voltage used when programming a block or a cell in flash memory. Another example of a flash programming parameter may be the programming time for a flash cell/block (e.g., the amount of time within which the controller 230 should program and/or write to a flash cell/block). Varying the flash programming parameters used to write data to the flash memory (e.g., non-volatile memory 140, cells, blocks, etc.) may improve health and/or life of the flash memory. For example, each write to a flash cell/block may degrade or decrease the health/life of the flash cell/block. Programming a flash cell/block with a lower voltage may degrade the flash cell/block more slowly than using a higher voltage. In another example, having a shorter programming time may allow the controller to write data more quickly (which may be useful for higher encoding rates). However, the shorter programming time may decrease the health of the flash cell/block more quickly than using a longer programming time (which may be used if encoding rates are lower).

In one embodiment, the neural network 232 (e.g., the controller 230) may determine the inferences over a period of time. For example, the neural network 232 may analyze multiple digital videos to perform an initial training of the neural network 232. After the neural network has been trained (by analyzing an initial set of digital videos), the neural network 232 may generate inferences which may be used by the media engine 231.

In some embodiments, the media engine 231 may store a digital video in the non-volatile memory 140 after the digital video has been encoded (e.g., may store an encoded digital video in the non-volatile memory 140). The media engine 231 may determine an error correction scheme and/or flash programming parameters for the digital video based on various factors. For example, the media engine 231 may determine an error correction scheme and/or flash programming parameters based on one or more states (e.g., various parameters, status, conditions, etc.) that may indicate the health of the one or more components (e.g., cells, blocks, etc.) of the non-volatile memory 140 (e.g., flash memory), as discussed in more detail below. In another example, the media engine 231 may determine an error correction scheme and/or flash programming parameters based on one or more inferences determined and/or generated by the neural network 232, as discussed in more detail below.

In one embodiment, the media engine 231 (e.g., the controller 230) may determine, identify, select, etc., an error correction scheme and/or error correction mechanism based on one or more states of the one or more component of the non-volatile memory 140. As discussed, a state of a component of a non-volatile memory 140 may indicate health of the component and/or the non-volatile memory 140 (e.g., the endurance of a block/cell, the error rate for a block/cell, etc.) and/or may indicate one or more operations being performed by the controller 130 (e.g., garbage collection operations). The media engine 231 may identify an error correction scheme that may increase the life or usability of the data storage device 120. For example, the media engine 231 may identify a weaker error correction code from a set of error correction codes. The weaker error correction code may use less data/space to store the digital video which may allow more digital videos to be stored on in the non-volatile memory 140. This may also increase the endurance of the of the non-volatile memory 140 because using less data/space to storage digital videos allows the controller 230 to avoid reprogramming or rewriting the non-volatile memory 140 (e.g., flash memory) to store new digital videos. In another example, the media engine 231 may use a weaker error correction code because the controller 230 may also be performing garbage collection operations while the digital video is being encoded and/or store. A weaker error correction code may use fewer computational resources of the controller 230 and may allow the controller 230 to perform the garbage collection activities more quickly and/or efficiently. The controller 230 and/or media engine 231 may store the digital video on the non-volatile memory based on and/or using the error correction scheme (e.g., the error correction code, a parity code, etc.). For example, the controller 230 and/or media engine 231 may generate codewords to store the digital video using a selected error correction code.

In one embodiment, the media engine 231 (e.g., the controller 230) may determine, identify, select, etc., one or more flash programming parameters (e.g., NAND trim parameters, trim parameters, etc.) based on one or more states of the one or more component of the non-volatile memory 140. For example, the media engine 231 may determine a voltage to use when programming and/or writing data to a flash cell/block based on the endurance (e.g., a state, the health, etc.) of a flash cell/block. If the endurance of the flash cell/block is low (e.g., below a threshold), the media engine 231 may determine flash programming parameters that reduce or minimize the decrease in endurance when writing/programming data to the flash cell/bock. For example, the media engine 231 may use a lower voltage when writing/programming data to the flash cell/block to reduce, minimize, etc., the decrease to the endurance of the flash cell/block. The media engine 231 may store the digital video in the non-volatile memory 140 (e.g., flash memory) using the flash programming parameters.

In one embodiment, the media engine 231 (e.g., the controller 230) may determine (e.g., identify, select, obtain, etc.) a set of flash programming parameters and/or error correction schemes based on one or more inferences (e.g., a set of inferences) determined by the neural network 232. For example, the neural network 232 may analyze a digital video and may determine how likely a user is to access or view the digital video. If the user is not likely to view the digital video, the media engine 231 may use a weaker error correction code and/or may use flash programming parameters that prolong the life and/or health of the data storage device. For example, the neural network 232 may determine that a digital video is a rerun of an episode of a television show and that the user is not likely to watch or access the digital video. The media engine 231 may store the digital video using a weaker error correction code or may store the digital video on blocks/cells that are not as healthy.

In some embodiments, the media engine 231 (e.g., the controller 230) may receive from the computing device 200 (e.g., from the processing device 110) a request to access the digital video (e.g., an encoded digital video) stored on the non-volatile memory 140. For example, the processing device 110 may transmit a request to retrieve and/or access the digital video via the host interface 160. In one embodiment, the media engine 231 may decode the digital video (e.g., decode the encoded digital video) to generate a decoded digital video. The media engine 231 may provide the decoded digital video the computing device (e.g., to the processing device 110). In another embodiment, the media engine 231 may provide the digital video (e.g., the encoded digital video) to the computing device 200 without decoding the digital video. The computing device 200 may decode the digital video to generate the decoded digital video.

In one embodiment, the data storage device 220 may lack an internal power source. For example, the data storage device 220 may not include a battery that may be used to operate (e.g., to power) one or more of the controller 230, the NVM interface 150, and the non-volatile memory 140. The data storage device 220 may receive power to operate from the computing device 200. For example, the data storage device 220 may receive power to operate one or more of the controller 230, the NVM interface 150, and the non-volatile memory 140 from the computing device via the host interface 160.

In one embodiment, the computing device 200 may be capable of encoding and/or decoding a digital video. For example, the processing device 110 may be capable of encoding and/or decoding a digital video at various bit rates and/or using various codecs. However, the computing device 200 may refrain from encoding and/or decoding the digital video. The computing device 200 may offload the encoding and/or decoding of the digital video to the data storage device 220 (e.g., to the controller 230, the media engine 231, etc.). This may decrease the use of computational resources of the computing device 200. For example, this may allow the processing device 110 to perform other actions, operations, tasks, functions, etc., because the processing device 110 has offloaded the encoding and/or decoding of digital videos to the data storage device 220.

As discussed above, computing devices may generally use data storage devices simply as a medium or location for storing data. The data storage devices may not be used by the computing device to perform other operations, actions, functions, or tasks. This may result in the performing the other operations, actions, functions, or tasks on the computing device which may increase the use of computational resources on the computing device. In addition, the computing device may not be aware of the health of flash memory in the data storage device 220. In one embodiment, the encoding and/or decoding of the digital videos is performed by the controller 230 (e.g., is offloaded to the controller 230). This may free up computing resources on the computing device 200 which may be used to perform other operations, functions, actions, tasks, etc. In one embodiment, the controller 230 may be able to use different codecs and/or encoding rates to encode the digital video. Using different codecs and/or encoding rates may allow the controller 230 to prolong the health, endurance, and/or life of the non-volatile memory 140. For example, using a lower encoding rate may allow the controller 230 to reduce the decrease in the endurance of flash cells/blocks. In one embodiment, using the controller 230 to encode the digital videos may allow the controller 230 to perform machine learning operations directly on the raw video data. This may allow the controller 230 to perform the machine learning operations more quickly, easily, and/or efficiently (e.g., without having to first decode a digital video). In another embodiment, performing the machine learning operation's using the controller 230 may free up computing resources on the computing device 200.

Figure 3:
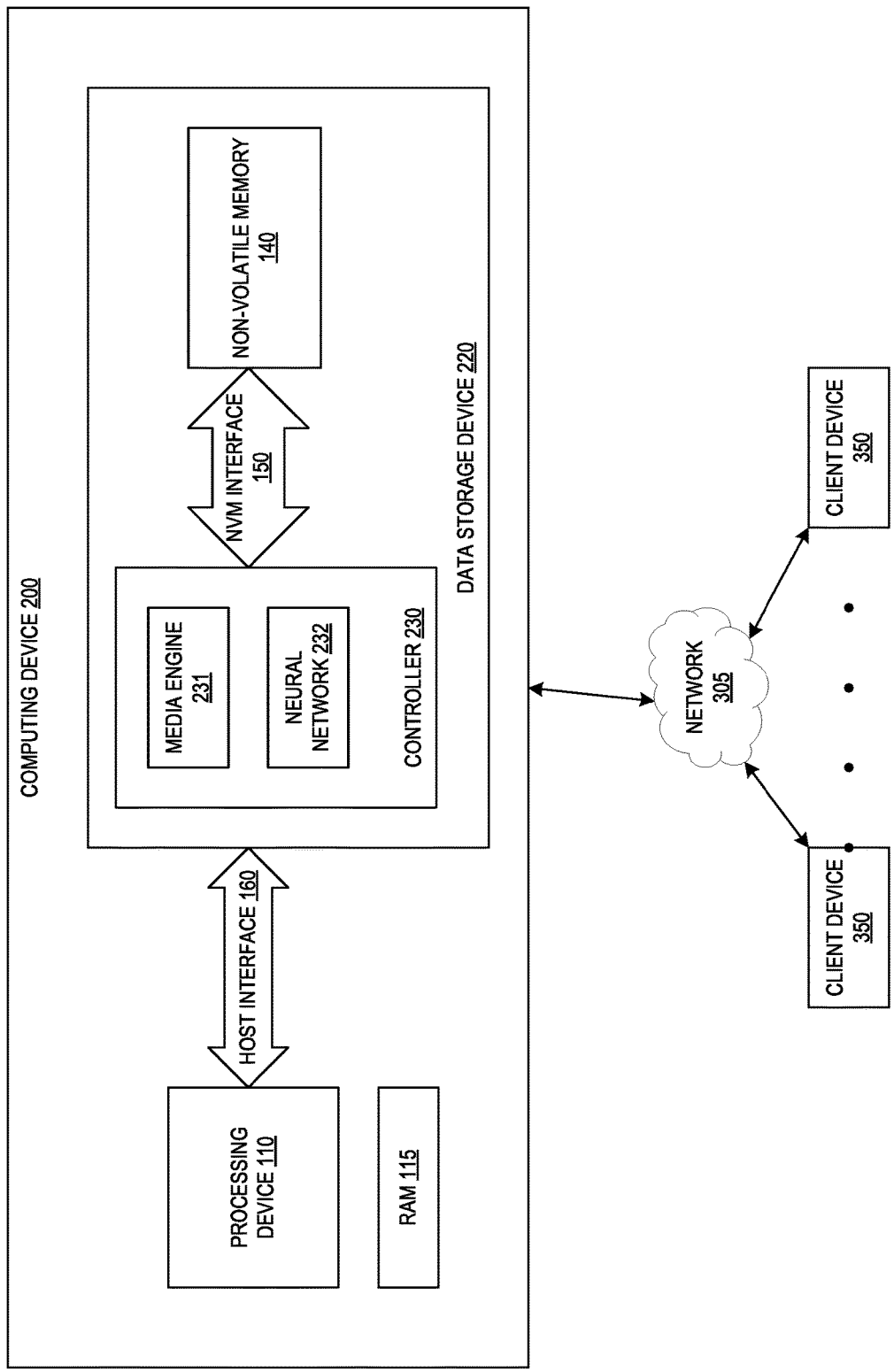
FIG. 3 is a block diagram illustrating an example computing device, in accordance with one or more embodiments of the present disclosure.

FIG. 3 is a diagram illustrating an example computing device 200, in accordance with some embodiments of the present disclosure. The computing device 200 includes a processing device 110, a random access memory (RAM) 115, and data storage device 220, as discussed above. The computing device 200 may be a device that may execute services, processes, applications, apps, instructions, etc., to perform one or more operations. In one embodiment, the computing device 200 may be set-top box (e.g., a cable set-top box), as discussed above. The computing device 200 may be coupled to client devices 350 via network 305. Examples of client devices 350 may include smartphone, cellular phones, table computers, laptop computers, desktop computers, smart watches, wearable devices, and/or other types of electronic/computing devices. Network 305 may be a public network (e.g., the Internet), a private network (e.g., a local area network (LAN)), a wide area network (WAN) such as the Internet, a wired network (e.g., Ethernet network), a wireless network (e.g., an 802.11 network or a Wi-Fi network), a cellular network (e.g., a Long Term Evolution (LTE) network), routers, hubs, switches, server computers, other types of computer networks, and/or a combination thereof. In some embodiments, one or more of the client devices 350 may also be coupled to the computing device 200 via a wired connection (e.g., an Ethernet cable, a coaxial cable, a USB cable, etc.).

Although the data storage device 220 is illustrated as part of the computing device 200 (e.g., may be located inside of a housing, chassis, case, slot, etc., of the computing device 200), in other embodiments, the data storage device 220 may be separate from the computing device 200 (e.g., may be an external device that is coupled to the computing device 200 via a cable, such as a universal serial bus (USB) cable). The data storage device 220 may be any type of data storage device, drive, module, component, system, or the like, that is configured to read data, write data, store data, and/or allow access to the data. For example, the data storage device 220 may be solid state disk drive (SSD), a disk drive, a flash drive, a flash disk, a secure digital (SD) card, a miniSD card, a microSD card, a compact flash (CF) card, a multimedia card (MMC), an eXtreme digital (xD) card, a thumb drive, a USB drive, a stick drive, a USB stick, etc. As shown, the data storage device 220 includes a controller 230 (e.g., control circuitry, software, firmware, or a combination thereof) and a non-volatile memory 140. The controller 230 includes a media engine 231 and a neural network 232. The controller 230 may be coupled to a non-volatile memory 140 via a NVM interface 150.

The non-volatile memory (NVM) 140 may be configured for long-term storage of data and may retain data between power on/off cycles of the data storage device 220. In some embodiments, the non-volatile memory 140 may include any combination of solid-state memory, magnetic media, optical disks, floppy disks, electrically programmable read only memories (EPROM), electrically erasable programmable read only memories (EEPROM), etc. The non-volatile memory 140 may be divided logically and/or physically into cells, dies, arrays, planes, blocks, pages, tracks, and sectors.

The controller 230 may include one or more processors, memory devices, data and/or power transmission channels/paths, boards, or the like. The controller 230 may be implemented as one or more SoC modules, FPGA modules, ASIC modules, processors, or the like. The controller 230 may be configured to receive data commands from a storage residing on the computing device 200. The controller 230 may communicate with the computing device 200 over a host interface 160, and may receive commands via the host interface 160. These commands may be referred to as data commands, storage commands, data access commands, data storage access commands, etc. Data may be accessed/transferred based on such data commands. The data storage device 220 may store data received from the computing device 200 such that the data storage device 220 acts as data storage for the computing device 200. The controller 230 may implement a logical interface that may present the non-volatile memory 140 as a set of logical addresses where data may be stored. Internally, the controller 230 may map logical addresses to various physical memory addresses in the non-volatile memory 140.

In one embodiment, the processing device 110 may receive capability data from the data storage device 220. The capability data may indicate to the processing device 110 (e.g., the computing device 200) whether the data storage device 220 is capable of encoding/decoding a digital video and/or is capable of performing one or more machine learning operations. In one embodiment, the controller 230 of the data storage device 220 may be capable of performing various computations, functions, operations, actions, etc. This may allow the computing device 200 (e.g., the processing device 110) to offload (e.g., transfer the set of computational operations to the data storage device 220). For example, the computing device 200 offload the encoding, decoding, and/or machine learning operations to the data storage device 220.

In one embodiment, the media engine 231 (e.g., the controller 230) may receive a digital video from the processing device 110 (e.g., from the computing device 200), as discussed above. For example, the digital video may be a video stream and the processing device 110 may receive one or more frames (e.g., images, pictures, etc.) of the digital video (e.g., video stream) via a network interface. The computing device 200 (e.g., the processing device 110) may provide the digital video to the media engine 231 and/or controller 230 as the computing device receives the digital video. For example, the computing device 200 may provide a video stream to the data storage device 220 as the computing device 200 receives the video stream.

In one embodiment, the media engine 231 (e.g., the controller 230) may receive client data from the computing device 200 (e.g., the processing device 110). The client data maybe data and/or other information that may indicate and/or identify the client devices 350 that may be communicatively coupled to the computing device 200 via the network 305. A client device 350 may access digital videos (and other digital media) that may be stored on the data storage device 220. For example, a client device 350 may communicate with the computing device 200 to access, play, view, etc., a digital video that was recorded by the computing device 200 (e.g., recorded by a set-top box).

The client data (received by the data storage device 220 from the client device 350) may indicate various information about the client devices 350. In one embodiment, the client data may indicate a type of the client device 350. For example, the client data may indicate that a client device is a smartphone, a tablet computer, a laptop computer, a desktop computer, etc. In another embodiment, the client device may indicate a resolution (e.g., a display resolution, a screen resolution, etc.) for a client device 350. For example, the client data may indicate the resolution of a screen/display of the client device 350 (e.g., 720P, 1080P, 4K, pixel width and pixel height, etc.). In a further embodiment, the client data may indicate one or more playback parameters for a client device 350. For example, the client data may indicate the codecs that are supported and/or used by the client device 350. In another example, the client data may indicate the computational and/or storage resources of a client device 350 (E.g., processor type, processor speed, amount of RAM, storage space, etc.). In a further example, the client data may indicate a network throughput/bandwidth for a client device 350. This may indicate the amount of data that a client device 350 is able to communicate within a period of time (e.g., 10 megabits per second, 50 megabits per second, etc.). Playback parameters may also be referred to as playback input parameters.

In one embodiment, the media engine 231 (e.g., the controller 230) may determine (e.g., identify, select, etc.) a first encoding rate for the digital video from a plurality of encoding rates based the client data. The media engine 231 may be able to encode the digital video at different encoding rates (e.g., bit rates) based on the client data. For example, a higher encoding rate may use more computational resources (e.g., may use more resources of a processing device, a processor, etc.) to decode the digital video. A smartphone may not have as many computational resources as a laptop computer or a desktop computer. If the client device 350 is a smartphone, encoding the digital video at a lower encoding rate (e.g., a lower bit rate) may allow the client device 350 to use fewer computational resources when viewing or playing the digital video. If the client device 350 is a laptop or a desktop computer, the client device 350 may have more computational resources available and may be able to view and/or play a digital video that is encoded at a higher encoding rate more easily (e.g., without impacting other operations or functions being performed on the client device 350). The media engine 231 may also determine an encoding rate based on the network bandwidth of a client device 350. For example, if the network bandwidth or data rate of a client device 350 is lower, the media engine 231 may use a lower encoding rate so that a smaller digital video (e.g., less data) is generated. This may allow the client device 350 to view or play the digital video properly (e.g., without buffering or stuttering) even though the client device 350 has a lower network bandwidth.

In one embodiment, the media engine 231 (e.g., the controller 230) may determine (e.g., identify, select, etc.) a first codec for the digital video from a plurality of codecs based on the set of states (e.g., the endurance, age, health, etc.) for the component components (e.g., blocks, cells, etc.). For example, a client device 350 may support (e.g., use) some codecs but may not support other codecs. If the digital video is access by a client device 350 that does not support a first codec, then encoding the digital video using the first codec may cause the client device 350 to be unable to view or play the digital video. The media engine 231 may select a second codec that is supported by the client device 350 and may encode the digital video using second codec so that the client device is able to view or play the digital video.

As discussed above, encoding the digital video may generate (e.g., may result in) an encoded digital video. After encoding the digital video (e.g., after generating an encoded digital video based on an encoding rate and/or codec), the media engine 231 and/or the controller 230 may store the encoded digital video in the non-volatile memory 140. For example, the media engine 231 and/or the controller 230 may write the encoded digital video (e.g., a video file) to cells, blocks, pages, portions, etc., of the non-volatile memory 140.

As illustrated in FIG. 3, the controller 230 includes a neural network 232. The neural network 232 may be a collection of connected and/or interconnected nodes, and weight values that may be scaling factors between two or more nodes, as discussed above. For example, the neural network 232 may be a CNN or a RNN. The media engine 231 may perform one or more machine learning operations by using and/or executing the neural network 232 to analyze the digital video. As discussed above, the neural network 232 may be able to perform machine learning operations on the digital videos more easily because the media engine 231 and/or the controller 230 is encoding the digital video. This allows the neural network 232 to perform the machine learning operations on the digital video before it is encoded. This allows the data storage device 220 to perform machine learning operations on the digital video more quickly, easily, and/or efficiently. This may also allow the computing device 200 to offload the machine learning operations to the data storage device 220.

In one embodiment, the media engine 231 and/or the neural network 232 may determine one or more inferences (e.g., a set of inferences) based on the one or more machine learning operations, as discussed above. The media engine 231 (e.g., the controller 230) may determine (e.g., identify, select, obtain, etc.) an encoding rate, a codec, a set of flash programming parameters and/or error correction schemes based on one or more inferences (e.g., a set of inferences) determined by the neural network 232. For example, the neural network 232 may analyze the viewing or access histories of different client devices 350 (e.g., may analyze which client devices 350 access which digital videos). The media engine 231 may determine that a particular client device 350 that generally access a type of digital videos (e.g., news broadcasts) has a particular display resolution. The media engine 231 may identify an encoding rate and/or codec based on the display resolution.

In some embodiments, the media engine 231 (e.g., the controller 230) may receive from the computing device 200 (e.g., from the processing device 110) to access the digital video (e.g., an encoded digital video) stored on the non-volatile memory 140. The media engine 231 may decode the digital video (e.g., decode the encoded digital video) and may provide the decoded digital video the computing device (e.g., to the processing device 110). The media engine 231 may also provide the digital video (e.g., the encoded digital video) to the computing device 200 without decoding the digital video.

In one embodiment, the data storage device 220 may lack an internal power source. The data storage device 220 may receive power to operate from the computing device 200. In one embodiment, the computing device 200 may be capable of encoding and/or decoding a digital video. However, the computing device 200 may refrain from encoding and/or decoding the digital video. The computing device 200 may offload the encoding and/or decoding of the digital video to the data storage device 220 (e.g., to the controller 230, the media engine 231, etc.).

As discussed above, computing devices may use data storage devices simply as a medium or location for storing data. The data storage devices may not be used by the computing device to perform other operations, actions, functions, or tasks. This may result in the performing the other operations, actions, functions, or tasks on the computing device which may increase the use of computational resources on the computing device. In addition, the computing device may not be aware of the health of flash memory in the data storage device 220. In one embodiment, the encoding and/or decoding of the digital videos is performed by the controller 230 (e.g., is offloaded to the controller 230). This may free up computing resources on the computing device 200 which may be used to perform other operations, functions, actions, tasks, etc. In one embodiment, the controller 230 may be able to use different codecs and/or encoding rates to encode the digital video. Using different codecs and/or encoding rates may allow the controller 230 to prolong the health, endurance, and/or life of the non-volatile memory 140. In one embodiment, using the controller 230 to encode the digital videos may allow the controller 230 to perform machine learning operations directly on the raw video data. This may allow the controller 230 to perform the machine learning operations more quickly, easily, and/or efficiently (e.g., without having to first decode a digital video). In another embodiment, performing the machine learning operation's using the controller 230 may free up computing resources on the computing device 200.

Figure 4:
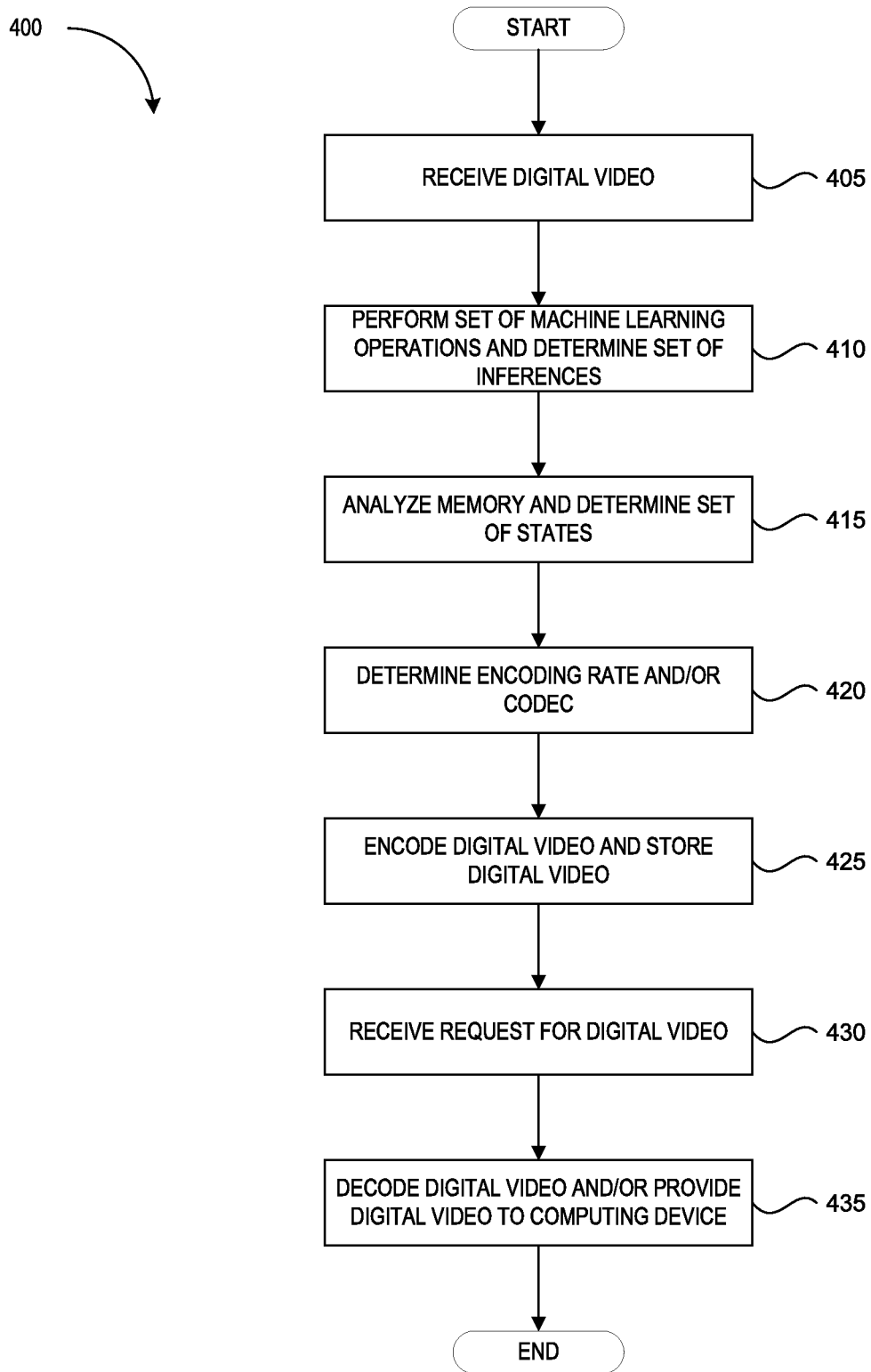
FIG. 4 is a flowchart illustrating an example a process for encoding digital videos, in accordance with one or more embodiments of the present disclosure.

FIG. 4 is a flowchart illustrating an example a process 400 for encoding digital videos, in accordance with one or more embodiments of the present disclosure. The process 400 may be performed by a processing device (e.g., a processor, a central processing unit (CPU), a controller, an application-specific integrated circuit (ASIC), a field programmable gate array (FPGA), etc.), a neural network, a media engine, etc. For example, the process 400 may be performed by a controller of a data storage device. The controller, processing device, neural network, and/or media engine may be processing logic that includes hardware (e.g., circuitry, dedicated logic, programmable logic, microcode, etc.), software (e.g., instructions run on a processor to perform hardware simulation), firmware, or a combination thereof.

The process 400 begins at block 405 where the process 400 receives a digital video. For example, the process 400 may receive a streaming video or video stream from a processing device of a computing device (e.g., a set-top box). At block 410, the process 400 may optionally perform a set of machine learning operations and determine a set of inferences. For example, the process 400 may use a neural network to analyze a digital video and generate one or more inferences based on the analysis. The process 400 may analyze a memory of the data storage device (e.g., a flash memory, a non-volatile memory, etc.) and may determine a set of states of the one or components of the memory. For example, the process 400 may analyze one or more cells/blocks and may determine the endurance, age, error rate, etc., of the cells/blocks.

At block 420, the process 400 may determine an encoding rate and/or codec to use when encoding the digital video. The process 400 may determine the encoding rate and/or codec based on the set of states of the components of the memory and/or based on the inferences generated by the neural network, as discussed above. At block 425, the process 400 may encode the digital video based on the encoding rate and/or coded. For example, the process 400 may encode the digital video at a determined encoding rate using a determined codec. The process 400 may store the encoded digital video in the memory at block 425.

At block 430, the process 400 may receive a request for the digital video. For example, the process 400 may receive a request to retrieve, read, access, etc., the digital video. The request may be received from the computing device that is coupled to the data storage device, and/or may be received from a client device coupled to the computing device (via a network). At block 435, the process 400 may decode the digital video and provide the decoded digital video (e.g., decoded frames of the digital video) to the computing device. The process 400 may also provide the encoded digital video the computing device without decoding the encoded digital video.

Figure 5:
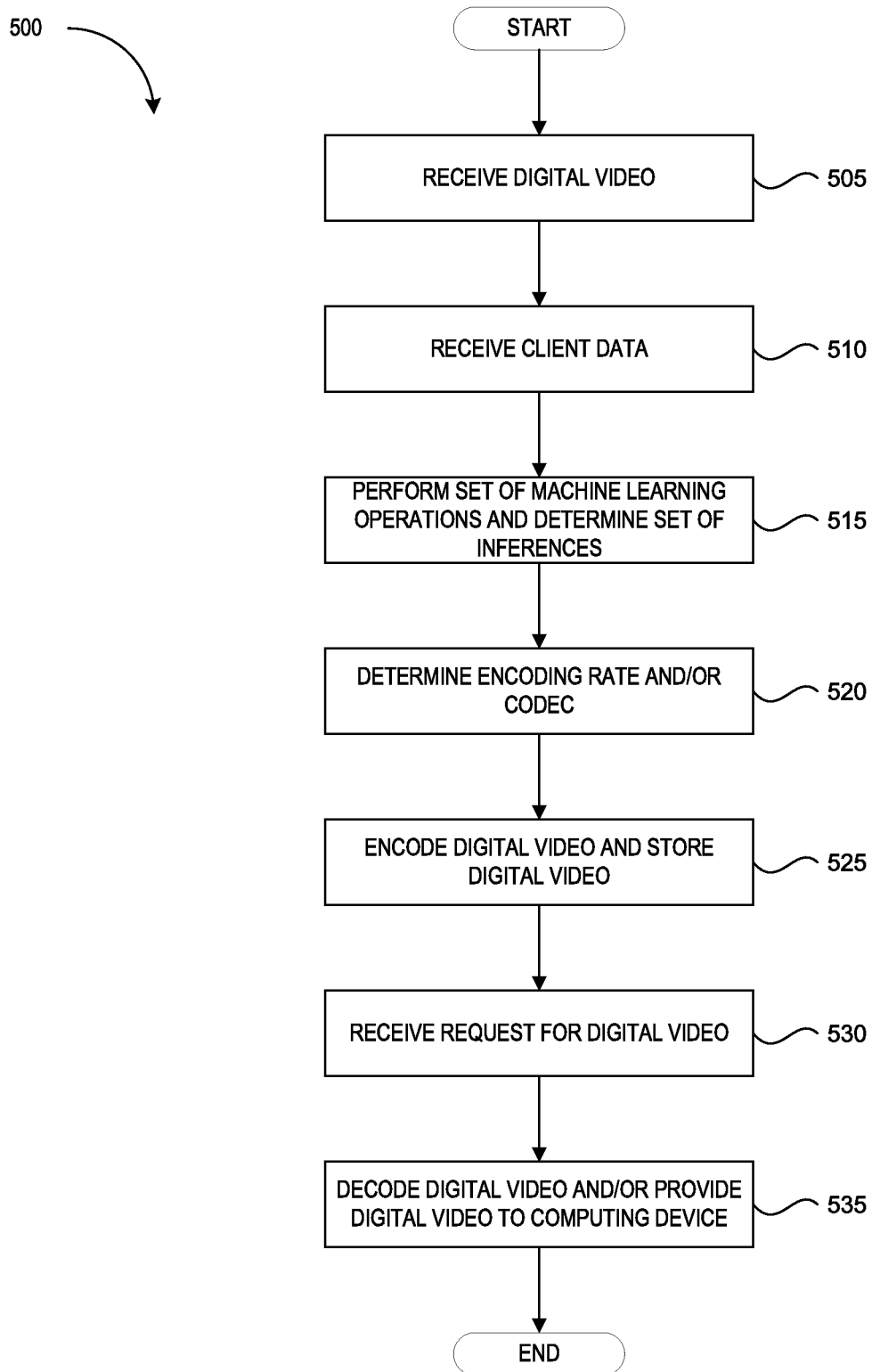
FIG. 5 is a flowchart illustrating an example process for encoding digital videos, in accordance with one or more embodiments of the present disclosure.

FIG. 5 is a flowchart illustrating an example a process 500 for encoding digital videos, in accordance with one or more embodiments of the present disclosure. The process 500 may be performed by a processing device (e.g., a processor, a central processing unit (CPU), a controller, an application-specific integrated circuit (ASIC), a field programmable gate array (FPGA), etc.), a neural network, a media engine, etc. For example, the process 500 may be performed by a controller of a data storage device. The controller, processing device, neural network, and/or media engine may be processing logic that includes hardware (e.g., circuitry, dedicated logic, programmable logic, microcode, etc.), software (e.g., instructions run on a processor to perform hardware simulation), firmware, or a combination thereof.

The process 500 begins at block 505 where the process 500 receives a digital video. For example, the process 500 may receive a streaming video or video stream from a processing device of a computing device (e.g., a set-top box). At block 510, the process 500 may receive client data from a computing device coupled to the data storage device. The client data may indicate information about the client devices that may be coupled to the computing device, as discussed above. For example, the client data may include the type, resolution, playback parameters, network bandwidths, identifiers (e.g., names), etc., of the client devices. At block 515, the process 500 may optionally perform a set of machine learning operations and determine a set of inferences. For example, the process 500 may use a neural network to which client devices access which digital videos and/or which types of digital videos. The process 500 may also analyze a memory of the data storage device (e.g., a flash memory, a non-volatile memory, etc.) and may determine a set of states of the one or more components of the memory at block 515.

At block 520, the process 500 may determine an encoding rate and/or codec to use when encoding the digital video. The process 500 may determine the encoding rate and/or codec based on the client data, as discussed above. At block 525, the process 500 may encode the digital video based on the encoding rate and/or coded. For example, the process 500 may encode the digital video at a determined encoding rate using a determined codec. The process 500 may store the encoded digital video in the memory at block 525.

At block 530, the process 500 may receive a request for the digital video. For example, the process 500 may receive a request to retrieve, read, access, etc., the digital video. The request may be received from the computing device that is coupled to the data storage device, and/or may be received from a client device coupled to the computing device (via a network). At block 535, the process 500 may decode the digital video and provide the decoded digital video (e.g., decoded frames of the digital video) to the computing device. The process 500 may also provide the encoded digital video the computing device without decoding the encoded digital video.

Although the present disclosure may refer to a digital video, the embodiments, implementations, and/or examples disclosed herein may be applied to other types of digital media in other embodiments. For example, instead of a digital video, data storage device may receive streaming audio.

GENERAL COMMENTS

Those skilled in the art will appreciate that in some embodiments, other types of distributed data storage systems may be implemented while remaining within the scope of the present disclosure. In addition, the actual steps taken in the processes discussed herein may differ from those described or shown in the figures. Depending on the embodiment, certain of the steps described above may be removed, others may be added.

While certain embodiments have been described, these embodiments have been presented by way of example only, and are not intended to limit the scope of protection. Indeed, the novel methods and systems described herein may be embodied in a variety of other forms. Furthermore, various omissions, substitutions and changes in the form of the methods and systems described herein may be made. The accompanying claims and their equivalents are intended to cover such forms or modifications as would fall within the scope and spirit of the protection. For example, the various components illustrated in the figures may be implemented as software and/or firmware on a processor, ASIC/FPGA, or dedicated hardware. Also, the features and attributes of the specific embodiments disclosed above may be combined in different ways to form additional embodiments, all of which fall within the scope of the present disclosure. Although the present disclosure provides certain preferred embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

The words "example" or "exemplary" are used herein to mean serving as an example, instance, or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this disclosure, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this disclosure and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Furthermore, the terms "first," "second," "third," "fourth," etc., as used herein are meant as labels to distinguish among different elements and may not necessarily have an ordinal meaning according to their numerical designation.

All of the processes described above may be embodied in, and fully automated via, software code modules executed by one or more general purpose or special purpose computers or processors. The code modules may be stored on any type of computer-readable medium or other computer storage device or collection of storage devices. Some or all of the methods may alternatively be embodied in specialized computer hardware.

What is claimed is:

1. An apparatus, comprising:
   a memory configured to store data; and
   a controller coupled to the memory, the controller configured to:
   receive a digital video;
   analyze one or more components of the memory;
   determine a set of states for the one or more components of the memory based on the analysis of the one or more components of the memory;
   determine a first encoding rate for the digital video from a plurality of encoding rates based on the set of states for the one or more components of the memory;
   encode the digital video based on the first encoding rate to generate an encoded digital video; and
   store the encoded digital video in the memory.

2. The apparatus of claim 1, wherein the controller is further configured to:
   determine a first codec for the digital video from a plurality of codecs based on the set of states; and
   encode the digital video further based on the first codec.

3. The apparatus of claim 1, wherein:
   the memory comprises flash memory; and
   the set of states comprises one or more of:
   an endurance of a memory cell of the flash memory;
   an age of the memory cell of the flash memory; and
   a garbage collection state of the apparatus.

4. The apparatus of claim 1, wherein the controller is further configured to:
   perform a set of machine learning operations on the digital video prior to encoding the digital video; and
   determine a set of inferences based on the set of machine learning operations.

5. The apparatus of claim 4, wherein to store the encoded digital video in the memory, the controller is further configured to:
   identify first error correction scheme from a plurality of error correction schemes based on the set of inferences; and
   store the encoded digital video based on the first error correction scheme.

6. The apparatus of claim 1, wherein the controller is further configured to:

determine a set of audio preferences for the digital video based on one or more of user data and a set of inferences determined based on a set of machine learning operations; and store a set of audio data for the digital video based on the set of audio preferences, wherein each audio data in the set of audio data is associated with a different language for the digital video.

7. The apparatus of claim 1, wherein to store the encoded digital video in the memory, the controller is further configured to:

determine a set of flash programming parameters based on the set of states; and store the encoded digital video in the memory based on the set of flash programming parameters.

8. The apparatus of claim 7, wherein:

the set of flash programming parameters is further based on a set of inferences; and the set of inferences are determined based on a set of machine learning operations.

9. The apparatus of claim 1, wherein the controller is further configured to:

receive a request to access the digital video from a computing device; and decode the encoded digital video to generate a decoded digital video; and provide the decoded digital video to the computing device; or provide the encoded digital video to the computing device for decoding.

10. The apparatus of claim 1, wherein:

the apparatus comprises a data storage device for the computing device; and the digital video is received from the computing device.

11. The apparatus of claim 1, wherein:

the apparatus is configured to be coupled to a computing device;

the computing device is capable of encoding the digital video; and the computing device refrains from encoding the digital video.

12. The apparatus of claim 1, wherein:

the apparatus lacks an internal power source; and the apparatus is configured to receive power to operate from the computing device.

13. A method, comprising:

receiving, by a data storage device, a digital video;

analyzing one or more components of a memory of the data storage device;

determining a set of states for one or more components of the memory based on the analysis of the one or more components of the memory;

determining a first codec for the digital video from a plurality of codecs based on the set of states for the one or more components of the memory;

encoding the digital video based on the first codec to generate an encoded digital video; and storing the encoded digital video in the memory.

14. The method of claim 13, further comprising:

performing a set of machine learning operations on the digital video prior to encoding the digital video.

15. The method of claim 14, further comprising:

determining a set of inferences based on the set of machine learning operations.

16. The method of claim 13, further comprising:

determining a set of audio preferences for the digital video based on one or more of user data and a set of inferences determined based on a set of machine learning operations; and storing a set of audio data for the digital video based on the set of audio preferences, wherein each audio data in the set of audio data is associated with a different language for the digital video.

17. An apparatus, comprising:

a memory;

means for determining an encoding rate for digital video based on a set of states of the memory, wherein the set of states comprises one or more of an endurance of a memory cell of the memory, an age of the memory cell of the memory, and a garbage collection state; and means for encoding the digital video based on the encoding rate.

18. The method of claim 13, wherein the set of states comprises one or more of:

an endurance of a memory cell of the memory;

an age of the memory cell of the memory; and a garbage collection state.

19. The method of claim 13, wherein the digital video is received from a computing device.

20. The method of claim 13, wherein:

the data storage device lacks an internal power source; and the data storage device is configured to receive power to operate from a computing device.

* * * * *